United States Patent
Hayashi

(10) Patent No.: US 12,330,452 B2
(45) Date of Patent: Jun. 17, 2025

(54) TIRE

(71) Applicant: BRIDGESTONE CORPORATION, Tokyo (JP)

(72) Inventor: Naohiro Hayashi, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/714,198

(22) PCT Filed: Sep. 20, 2022

(86) PCT No.: PCT/JP2022/035032
§ 371 (c)(1),
(2) Date: May 29, 2024

(87) PCT Pub. No.: WO2023/112415
PCT Pub. Date: Jun. 22, 2023

(65) Prior Publication Data
US 2025/0026153 A1    Jan. 23, 2025

(30) Foreign Application Priority Data
Dec. 13, 2021    (JP) .............................. 2021-202052

(51) Int. Cl.
*B60C 11/12*    (2006.01)
*B60C 11/03*    (2006.01)

(52) U.S. Cl.
CPC ...... *B60C 11/1281* (2013.01); *B60C 11/0323* (2013.01); *B60C 2011/0348* (2013.01); *B60C 2200/065* (2013.01)

(58) Field of Classification Search
CPC ............. B60C 11/0323; B60C 11/1281; B60C 11/1353
See application file for complete search history.

(56) References Cited

U.S. PATENT DOCUMENTS 6,315,018 B1 * 11/2001 Watanabe ........... B60C 11/0306
                                                        152/DIG. 3
9,061,551 B2 * 6/2015 Taniguchi ........... B60C 11/1281
(Continued)

FOREIGN PATENT DOCUMENTS

DE    102019211027 A1 * 1/2021    ........... B60C 11/032
EP       2311655 A1    4/2011
(Continued)

OTHER PUBLICATIONS

Jun. 13, 2024, International Preliminary Report on Patentability issued in the International Patent Application No. PCT/JP2022/035032.
(Continued)

*Primary Examiner* — Robert C Dye
(74) *Attorney, Agent, or Firm* — KENJA IP LAW PC

(57) ABSTRACT

The tire 10 comprises a widthwise narrow groove 8. The center-side narrow groove portion 8a is formed, from groove opening side to groove bottom side, in a shape of a continuous series of: a narrow section 8au including the groove opening; a tapered section 8at where the groove width increases toward the groove bottom; a wide straight section 8as extending in the groove depth direction with a constant groove width and having a groove width greater than that of the narrow section; and an arc-shaped section 8ab including the groove bottom, and the shoulder-side narrow groove portion 8b is formed, from groove opening side to groove bottom side, in a shape of a continuous series of: a narrow section 8bu including the groove opening; a tapered section 8bt where the groove width increases toward the groove bottom; and an arc-shaped section 8bb including the groove bottom.

20 Claims, 5 Drawing Sheets

Cross section A-A        Cross section B-B

(56) References Cited

U.S. PATENT DOCUMENTS

| | | |
|---|---|---|
| 11,511,568 B2 | 11/2022 | Watanabe |
| 2014/0130950 A1 | 5/2014 | Guichon |
| 2018/0281530 A1 | 10/2018 | Lawson et al. |
| 2019/0291514 A1* | 9/2019 | Byeon ................. B60C 11/1236 |
| 2022/0227180 A1 | 7/2022 | Tomida |
| 2022/0258543 A1 | 8/2022 | Hasegawa |
| 2023/0084725 A1* | 3/2023 | Voss .................... B60C 11/1281 |
| | | 152/209.18 |
| 2024/0181814 A1* | 6/2024 | Trowbridge ............ B60C 11/04 |

FOREIGN PATENT DOCUMENTS

| | | | |
|---|---|---|---|
| JP | 02267009 A * | 10/1990 | ............. B60C 11/12 |
| JP | H02267009 A | 10/1990 | |
| JP | H05254314 A | 10/1993 | |
| JP | H11151913 A | 6/1999 | |
| JP | 2018144553 A | 9/2018 | |
| JP | 2020001449 A | 1/2020 | |
| JP | 2021088279 A | 6/2021 | |
| JP | 2021100840 A * | 7/2021 | |
| WO | 2020250687 A1 | 12/2020 | |
| WO | 2020250993 A1 | 12/2020 | |

OTHER PUBLICATIONS

Feb. 3, 2025, search result of the Extended European Search Report issued by the European Patent Office in the corresponding European Patent Application No. 22906950.5.

Dec. 13, 2022, International Search Report issued in the International Patent Application No. PCT/JP2022/035032.

* cited by examiner

TIRE

TECHNICAL FIELD

This disclosure relates to a tire.

This application claims priority based on Japanese Patent Application No. 2021-202052 filed in Japan on Dec. 13, 2021, and the entire content thereof is incorporated herein.

BACKGROUND

In particular, in tires for construction and mining vehicles that transport ore and topsoil in mines, etc., especially in tires for construction and mining vehicles for good roads that are suitable for work on relatively firm road surfaces, mainly for mining copper ore, iron ore, and others, only relatively narrow grooves may be provided primarily in the tread portion to increase the rubber volume in the tread portion and improve wear life.

For example, PTL 1 discloses a tire for construction vehicles (OR) with relatively narrow grooves extending in the tire width direction in the tread portion.

CITATION LIST

Patent Literature

PTL 1: JP 2020-001449 A

SUMMARY

Technical Problem

However, in general, narrower groove widths in the tread portion tend to cause more separation between the tread rubber and the belt due to cuts from the road surface, known as cut separation. As a result, the total life of the tire may not be sufficiently improved, and there was still room for improvement in the conventional art described above.

Therefore, an object of the present disclosure is to provide a tire that suppresses cut separation while maintaining a sufficient wear life.

Solution to Problem

The tire of this disclosure comprises a widthwise narrow groove extending with a tire widthwise component on a tread surface, and is characterized in that,
  the widthwise narrow groove has a center-side narrow groove portion located on the inner side in the tire width direction and a shoulder-side narrow groove portion connected to the outer side of the center-side narrow groove portion in the tire width direction,
  in a cross-sectional view perpendicular to the extending direction of the center-side narrow groove portion, the center-side narrow groove portion is formed, from groove opening side to groove bottom side, in a shape of a continuous series of: a narrow section including the groove opening; a tapered section where the groove width increases toward the groove bottom; a wide straight section extending in the groove depth direction with a constant groove width and having a groove width greater than that of the narrow section; and an arc-shaped section including the groove bottom, and
  in a cross-sectional view perpendicular to the extending direction of the shoulder-side narrow groove portion, the shoulder-side narrow groove portion is formed, from groove opening side to groove bottom side, in a shape of a continuous series of: a narrow section including the groove opening; a tapered section where the groove width increases toward the groove bottom; and an arc-shaped section including the groove bottom.

Advantageous Effect

According to the present disclosure, it is possible to provide a tire that suppresses cut separation while maintaining a sufficient wear life.

DETAILED DESCRIPTION

Figure 1:
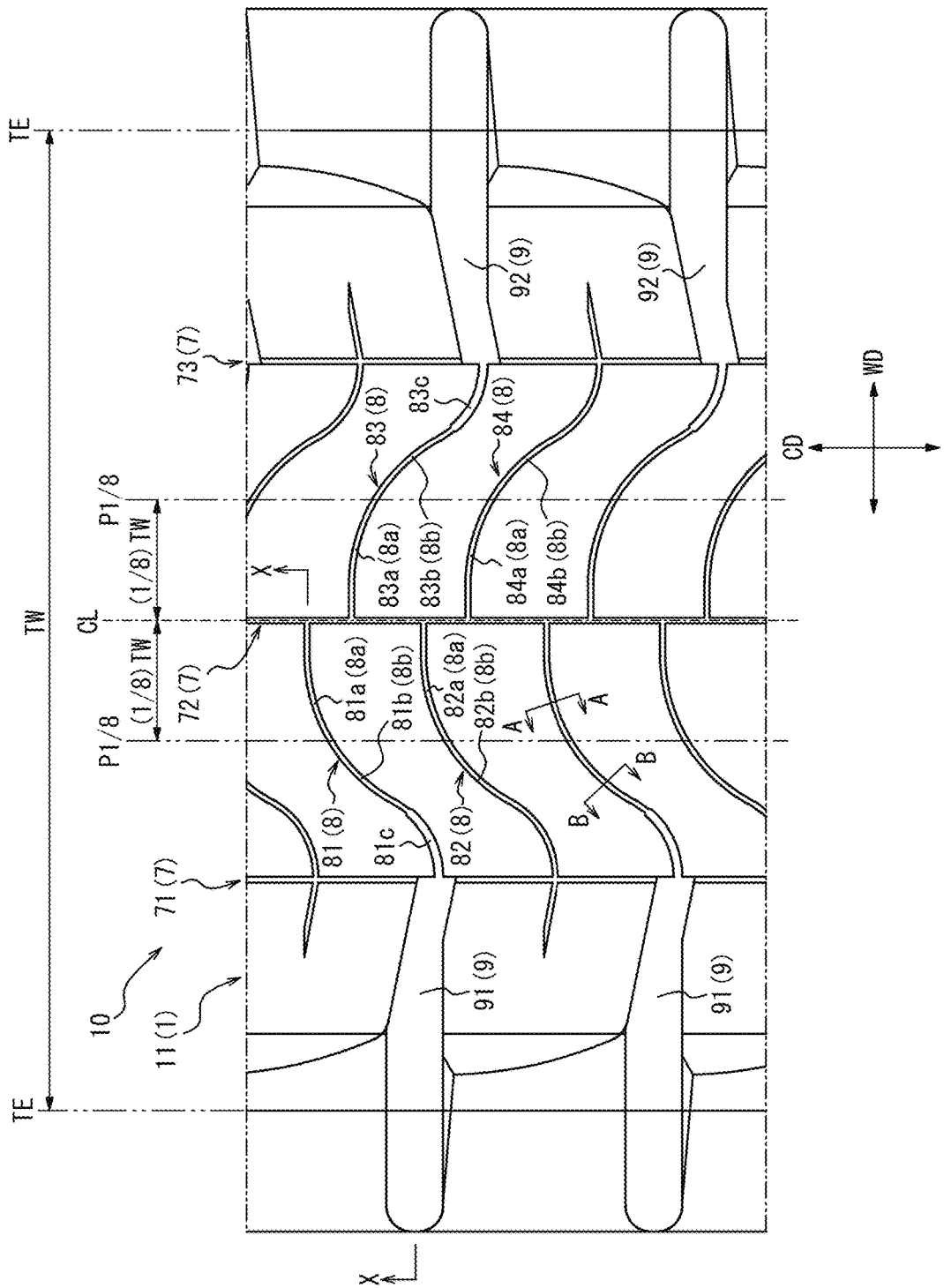
FIG. 1 is a development view illustrating the tread surface of a tire according to one embodiment of this disclosure.

The tire according to the present disclosure can be suitably used for any type of tire, and it is particularly suitable for use in pneumatic tires for construction and mining vehicles that transport ore and topsoil in mines, etc., especially in tires for construction and mining vehicles for good roads that are suitable for work on relatively firm road surfaces, mainly for mining copper ore, iron ore, and others.

Hereinafter, embodiments of the tire according to the present disclosure will be exemplified with reference to the drawings.

In each figure, common components and parts are marked with the same reference numerals/signs.

In this document, the term "tire circumferential direction" refers to the direction in which the tire rotates around its axis of rotation, the term "tire radial direction" refers to the direction perpendicular to the rotation axis the tire, and the term "tire width direction" refers to the direction parallel to the rotation axis of the tire. In some drawings, the tire circumferential direction is indicated by the sign "CD", the tire radial direction is indicated by the sign "RD", and the tire width direction is indicated by the sign "CD".

In addition, in this document, the side closer to the tire equatorial plane CL along the tire width direction is referred to as the "inner side in the tire width direction" and the side farther from the tire equatorial plane CL along the tire width direction is referred to as the "outer side in the tire width direction".

Figure 2A:
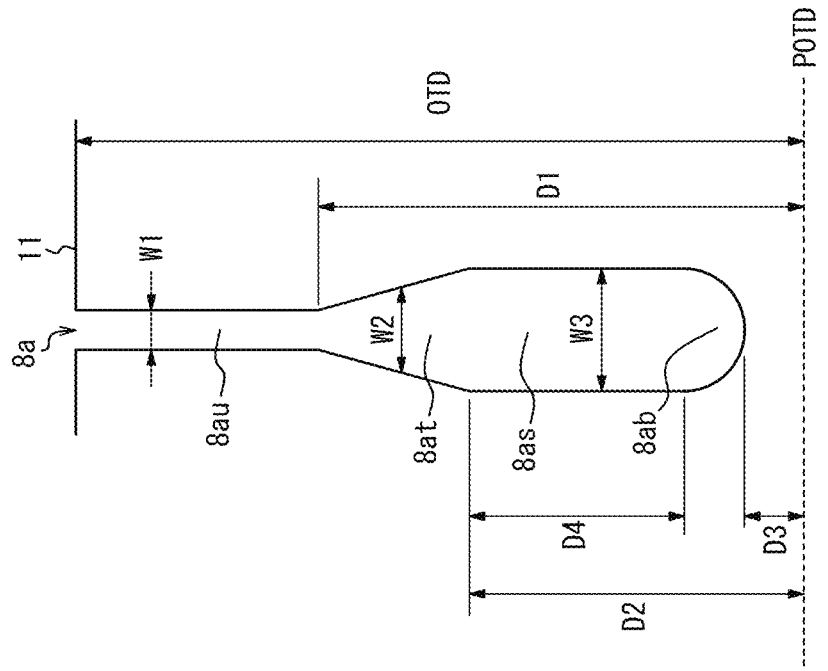
FIG. 2A is a cross-sectional view along the line A-A in FIG. 1.
Figure 2B:
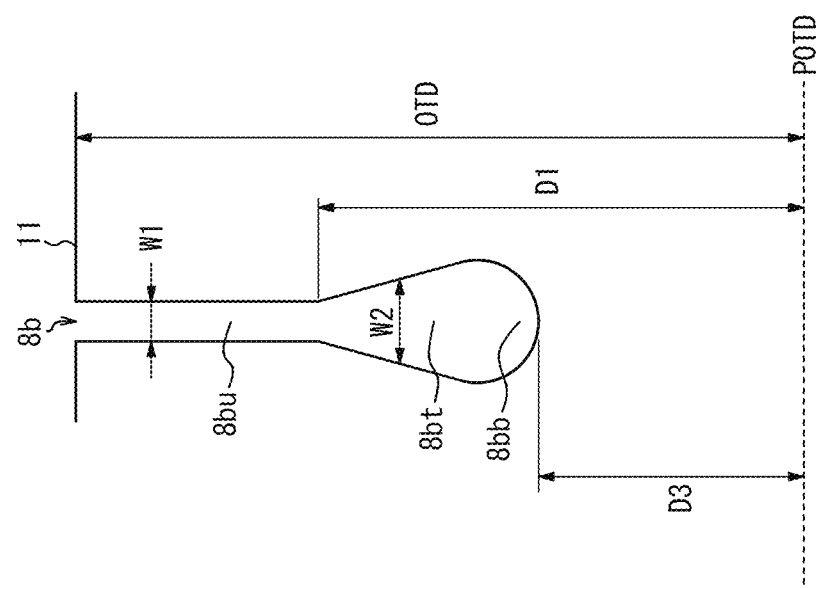
FIG. 2B is a cross-sectional view along the line B-B in FIG. 1.
Figure 3:
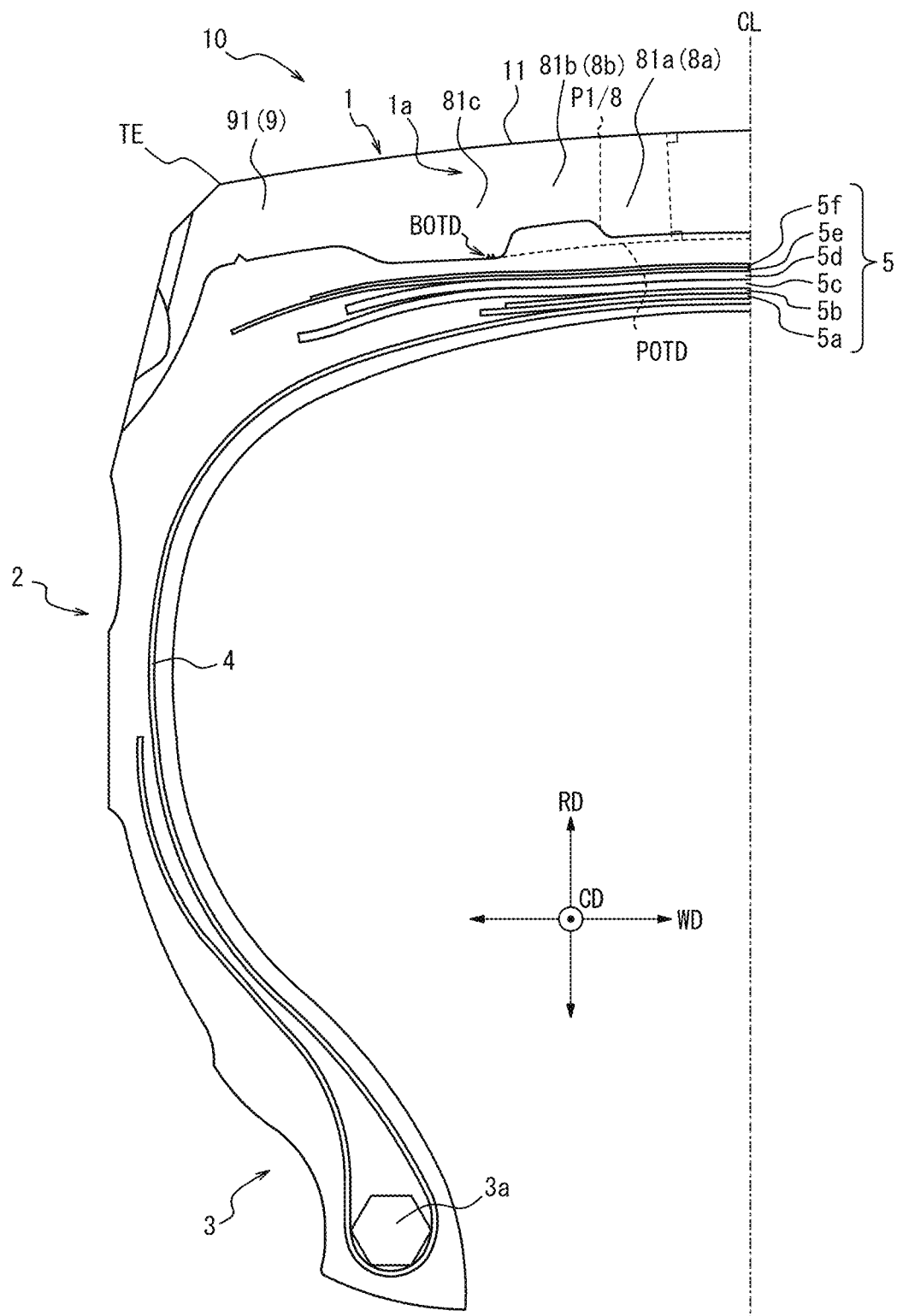
FIG. 3 is a partial cross-sectional view in the tire width direction of the tire half along the line X-X in FIG. 1.

FIGS. 1 to 3 are drawing to explain a tire 10 in accordance with one embodiment of this disclosure.

FIG. 1 is a development view illustrating the tread surface of a tire according to one embodiment of this disclosure. FIG. 2A is a cross-sectional view along the line A-A in FIG. 1, and FIG. 2B is a cross-sectional view along the line B-B in FIG. 1. FIG. 3 is a partial cross-sectional view in the tire width direction of the tire half along the line X-X in FIG. 1 (More specifically, a cross-sectional view of the tire half on one side relative to the tire equatorial plane CL, viewed from the tire circumferential direction CD side, cut along the centerline of a narrow width-direction groove 81 and a lug groove 91 in FIG. 1).

Note, that the tire of this disclosure may be configured as any type of tire, however, the tire in this embodiment is configured as a tire for construction and mining vehicles.

Hereafter, unless otherwise noted, the positional relationship and dimensions of each element shall be measured under the reference condition, with the tire mounted on an applicable rim, filled with prescribed internal pressure, and unloaded. In addition, under the condition that the tire is mounted on the applicable rim, filled to the prescribed internal pressure, and loaded with a maximum load, the width of the ground contact patch, in the tire width direction, which is in contact with the road surface is referred to as the "tread width (TW)", and the edge of the ground contact patch in the tire width direction shall be referred to as the "Tread edge (TE)".

As used herein, the term "applicable rim" refers to the standard rim in the applicable size (Measuring Rim in ETRTO's STANDARDS MANUAL and Design Rim in TRA's YEAR BOOK) as described or as may be described in the future in the industrial standard, which is valid for the region in which the tire is produced and used, such as JATMA YEAR BOOK of JATMA (Japan Automobile Tyre Manufacturers Association) in Japan, STANDARDS MANUAL of ETRTO (The European Tyre and Rim Technical Organization) in Europe, and YEAR BOOK of TRA (The Tire and Rim Association, Inc.) in the United States. For sizes not listed in these industrial standards, the term "applicable rim" refers to a rim with a width corresponding to the bead width of the pneumatic tire. The "applicable rim" includes current sizes as well as future sizes to be listed in the aforementioned industrial standards. An example of the "size as described in the future" could be the sizes listed as "FUTURE DEVELOPMENTS" in the ETRTO 2013 edition.

As used herein, the term "prescribed internal pressure" refers to the air pressure (maximum air pressure) corresponding to the maximum load capacity of a single wheel in the applicable size and ply rating, as described in the aforementioned JATMA YEAR BOOK and other industrial standards. In the case that the size is not listed in the aforementioned industrial standards, the term "prescribed internal pressure" refers to the air pressure (maximum air pressure) corresponding to the maximum load capacity specified for each vehicle in which the tire is mounted. Further, as used herein, the term "maximum load" means the load corresponding to the maximum load capacity in the tire of the applicable size described in the aforementioned industrial standards, or, for sizes not listed in the aforementioned industrial standards, the load corresponding to the maximum load capacity specified for each vehicle in which the tire is mounted.

In this document, the term "groove width" shall be measured in the direction parallel to the tread surface in a cross section perpendicular to the direction of groove extension at the tread surface, in the above reference condition. The groove width may vary in the direction perpendicular to the tread surface. In addition, as used herein, the term "groove depth direction" refers to the direction perpendicular to the tread surface in the above reference condition, and the "groove depth" herein shall be measured in the direction perpendicular to the tread surface in the above reference condition.

As illustrated in FIG. 3, the tire 10 according to one embodiment of this disclosure comprises a tread portion 1, a pair of sidewall portions 2 extending inward in the tire radial direction from both ends in the tire width direction of the tread portion 1, and a pair of bead portions 3 provided at the inner end in the tire radial direction of each sidewall portion 2.

In addition, the tire 10 comprises a pair of bead cores 3a, a carcass 4, a belt 5, a wire chafer 6, and a tread rubber 1a. The tire 10 may have an inner liner (not illustrated) on the innermost surface.

Although one half of the tire 10 is illustrated in FIG. 3, the other half of the tire 10 has the same configuration. However, the other half of the tire 10 may be configured differently from the tire half on one side.

Each bead core 3a is embedded in the corresponding bead portion 3. The bead core 3a comprises a plurality of bead wires with rubber coating around them. However, the bead core 3a may consist of a single bead wire. Preferably, the bead wire is composed of metal (e.g., steel). The bead wire can, for example, be composed of monofilament or stranded wire. Note, that the bead wire may be composed of organic or carbon fibers.

The carcass 4 straddles between the pair of bead cores 3a and extends toroidally through the pair of sidewall portions 2 and the tread portion 1. The carcass 4 consists of at least one (in this example, one) carcass ply made of rubber-coated carcass cords. The carcass cords can be formed, for example, with monofilaments or stranded wires.

In this embodiment, the carcass cords are composed of metal (e.g., steel), however, the carcass cords may be composed of organic fibers made of polyester, nylon, rayon, aramid, and others. In addition, in this embodiment, the carcass 4 is a radial carcass, but the carcass 4 may also be a bias carcass. Furthermore, in this embodiment, the carcass 4 has a ply body portion located between the pair of bead cores 3a and a ply turn-up portion that is folded from both ends of the ply body portion around the bead core 3a from inside to outside in the tire width direction. However, the turn-up style of the carcass 4 is not restricted, for example, the carcass 4 may be wrapped around the bead core 3a or may not have the ply turn-up portion. Note, that the bead portion 3 may be provided with a chaffer or the like (not illustrated) to protect the carcass 4.

The belt 5 is disposed on the outer side in the tire radial direction relative to the crown of the carcass 4. The belt 5 comprises at least one belt layer consisting of rubber-coated belt cords arranged at a predetermined angle with respect to the tire circumferential direction. As illustrated in FIG. 3, in this example, the belt 5 consists of six belt layers 5a, 5b, 5c, 5d, 5e and 5f.

In this embodiment, of the six belt layers 5a to 5f, the two belt layers 5a and 5b closer to the carcass 4 are formed with relatively narrow width in the tire width direction (e.g., 34 to 63% of the tread width TW). In addition, the belt cords that constitute the two belt layers 5a and 5b intersect each other and are inclined at relatively small angle (e.g., 4 to) 10° with respect to the tire circumferential direction. These allow the belt 5 (more specifically, the belt layers 5a and 5b) to exert the so-called tagger effect and bear sufficient tension in the tire circumferential direction to suppress the diameter growth in the tread portion 1.

In this embodiment, on the other hand, of the six belt layers 5a to 5f, the four belt layers 5c, 5d, 5e and 5f closer to the tread surface 11 are formed with a relatively wide width in the tire width direction (for example, 75 to 100% of the tread width TW). In addition, the belt cords that constitute the four belt layers 5c, 5d, 5e and 5f intersect each other between at least any two layers and are inclined at relatively large angle (e.g., 18 to) 35° with respect to the tire circumferential direction. These can suppress the occurrence of stress concentration and separation at the tire widthwise edge of the two belt layers 5a and 5b, which are closer to the carcass 4 described above, and thus suppress the decline in durability of the tire 10.

In this embodiment, the belt cord is composed of metal (e.g., steel), however, the belt cord may be composed of organic fibers made of polyester, nylon, rayon, aramid, and others.

Tread rubber 1a is located in the tread portion 1, on the outer side of the belt 5 in the tire radial direction. The tread rubber 1a constitutes the tread surface 11, which is the outer surface of the tread portion 1 in the tire radial direction. A tread pattern as illustrated in FIG. 1, which will be described below, is formed on the tread surface 11.

The tread pattern of the tire 10 according to one embodiment of this disclosure will be described below.

As illustrated in FIG. 1, the tire 10 of this embodiment has three circumferential narrow grooves 7 (71, 72, 73) extending with a tire circumferential component (in this example, extending along the tire circumferential direction (i.e., not inclined with respect to the tire circumferential direction)), (hereinafter also referred to as "extending in the tire circumferential direction"), widthwise narrow grooves 8 (81, 82, 83, 84) extending with a tire widthwise component (hereinafter also referred to as "extending in the tire width direction"), and lug grooves 9 (91, 92) which are also extending with a tire widthwise component. The tread pattern of the tread surface 11 is a block pattern, in which the tread surface 11 is divided into blocks by these circumferential narrow grooves 7, widthwise narrow grooves 8, and lug grooves 9. In addition, as illustrated in FIG. 1, the tread patterns of the two halves across the tire equatorial plane CL are slightly offset from each other in the tire circumferential direction, however, they are otherwise substantially the same. That is, in the developed view of the tread surface, the pattern of both halves can be superimposed on the other by shifting one in parallel and line symmetry.

However, in this embodiment, the tread pattern is not restricted as long as the tread surface 11 has the widthwise narrow groove 8.

In this embodiment, as illustrated in FIG. 1, the circumferential narrow groove 72 extends along and over the tire equatorial plane CL. The circumferential narrow grooves 71 and 73 are spaced in the tire width direction from the circumferential narrow groove 72 on each side of the circumferential narrow groove 72.

As illustrated in FIG. 1, the widthwise narrow grooves 81 to 84 extend in the tire width direction between the above circumferential narrow grooves 72 and 71, respectively, or between the above circumferential narrow grooves 72 and 73, respectively, to connect those circumferential grooves.

In this example, the widthwise narrow groove 81 differs from the widthwise narrow groove 82 only in that it has a second shoulder-side narrow groove portion 81c, which is described below. The widthwise narrow grooves 81 and 82 are arranged alternately at approximately equal intervals in the tire circumferential direction on one side of the tire half across the tire equatorial plane CL. Also, in this example, the widthwise narrow groove 83 differs from the widthwise narrow groove 84 only in that it has a second shoulder-side narrow groove portion 83c, which is described below. The widthwise narrow grooves 83 and 84 are arranged alternately at approximately equal intervals in the tire circumferential direction on the other side of the tire half across the tire equatorial plane CL.

As illustrated in FIG. 1, the widthwise narrow grooves 81 to 84 extend in the tire width direction in a curved, nearly S-shaped pattern in the developed view of the tread surface 11, however, the widthwise narrow grooves 81 to 84 need not extend in a curved pattern; for example, they may extend in a straight pattern.

Here, in this document, the term "narrow grooves" such as circumferential narrow grooves or widthwise narrow grooves refers to grooves in which, under the condition where the tire is mounted on the applicable rim, filled with prescribed internal pressure, and loaded with the maximum load, the groove walls contact each other and close at least partially in the groove depth direction. Especially when the tire 10 is a very large-sized pneumatic tire for construction and mining vehicles, such as in this embodiment, the widthwise narrow grooves 8 (81 to 84) preferably have a groove width of 3 to 18 mm, and 5 to 15 mm is more preferable, from the viewpoint of both securing sufficient drainage performance and cooling performance, and securing rubber volume and suppressing rigidity reduction of the tread portion 1.

As illustrated in FIG. 1, the lug grooves 91 and 92 extend from the circumferential narrow groove 71 or 72 in the tire width direction and reach to the tread edge TE, on the shoulder portion located on the outer side in the tire width direction of the tread surface 11. The lug groove 91 is connected to the circumferential narrow groove 71 and the widthwise narrow groove 81. Also, the lug groove 92 is connected to the circumferential narrow groove 73 and the widthwise narrow groove 83.

In this embodiment, as illustrated in FIGS. 1 and 2, the widthwise narrow grooves 8 (81 to 84) each have a center-side narrow groove portion 8a (81a to 84a) located on the inner side in the tire width direction and a shoulder-side narrow groove portion 8b (81b to 84b) connected to the outer side of the center-side narrow groove portion 8a (81a to 84a) in the tire width direction.

Here, "the center-side narrow groove portion 8a located on the inner side in the tire width direction" means that the center-side narrow groove portion 8a is located on the inner side in the tire width direction compared to the shoulder-side narrow groove portion 8b.

In this example, as illustrated in FIGS. 1 and 3, the boundary position in the tire width direction between the center-side narrow groove portion 8a (81a to 84a) and the shoulder-side narrow groove portion 8b (81b to 84b) on the tread surface 11 is on the ⅛ point, P1/8, described below, respectively. However, the boundary position in the tire width direction does not have to be on the ⅛ point, P1/8. In this example, as illustrated in FIG. 3, the center-side narrow groove portion 8a (81a) and the shoulder-side narrow groove portion 8b (81b) switch almost abruptly with substantially no transition area between them.

As illustrated in FIG. 2A, in a cross-sectional view perpendicular to the extending direction of the center-side narrow groove portion on the tread surface 11, the center-side narrow groove portion 8a (81a to 84a) of the widthwise narrow groove 8 (81 to 84) is formed, from groove opening side to groove bottom side, in a shape of a continuous series of: a narrow section 8au including the groove opening; a tapered section 8at where the groove width W2 increases toward the groove bottom; a wide straight section 8as extending in the groove depth direction with a constant groove width W3 and having a groove width greater than that of the narrow section 8au; and an arc-shaped section 8ab including the groove bottom. In other words, in the cross-sectional view above, the center-narrow groove portion 8a is formed in the shape of a paddle (an oar used for paddling a canoe, etc.).

The narrow section 8au includes the groove opening, i.e., it is located closest to the tread surface 11. As illustrated in FIG. 2A, in this example, the narrow section 8au has both groove walls in a straight line along the groove depth direction in a cross-sectional view, and extends in the groove depth direction with a constant and relatively small groove width W1. In this example, the narrow section 8au is formed to have the groove width W1 such that when the tire is mounted on the applicable rim, filled with the prescribed internal pressure, and loaded with the maximum load, at least some of the groove walls contact each other and close. However, the cross-sectional shape of the narrow section 8au is not particularly limited to the above shape.

The tapered section 8at is continuously connected to the bottom side of the narrow section 8au in the groove depth direction. The tapered section 8at is formed so that the groove width W2 increases toward the groove bottom side, i.e., both groove walls are tapered in abbreviated form in a cross-sectional view. As illustrated in FIG. 2A, in this example, the tapered section 8at has both groove walls extending straight in the groove depth direction, respectively, in a cross-sectional view, but both groove walls may extend curved (e.g., arc-shaped) in the groove depth direction, respectively. In addition, in this example, the tapered section 8at is formed so that the groove width W2 gradually (i.e., continuously) increases toward the groove bottom side, however, it may be formed so that the groove width W2 intermittently (i.e., discontinuously at a given position in the groove depth direction) increases toward the groove bottom side.

The wide straight section 8as is continuously connected to the groove bottom side of the tapered section 8at in the groove depth direction. In the wide straight section 8as, both groove walls are straight in a cross-sectional view (more specifically, they extend straight along the groove depth direction, i.e., parallel to the groove depth direction). This section extends in the groove depth direction with a constant and relatively large groove width W3. The groove width W3 of the wide straight section 8as is greater than the groove width of the narrow section 8au (more specifically, than the maximum groove width of the narrow section 8au) W1.

The arc-shaped section 8ab includes the groove bottom, i.e., it is located closest to the groove bottom. The arc-shaped section 8ab is continuously connected to the groove bottom side of the wide straight section 8as in the groove depth direction. As illustrated in FIG. 2A, in this example, the arc-shaped section 8ab is formed by a single arc that is approximately semicircular in a cross-sectional view, however, it does not necessarily have to be formed of exactly one arc in a cross-sectional view, for example, it may be formed of multiple arcs interlinked (and thus a smooth curved shape).

In this embodiment, as illustrated in FIG. 2A, the boundary portions of the narrow section 8au, the tapered section 8at, and the wide straight section 8as of the center-side narrow groove portion 8a are angular in a cross-sectional view, respectively. However, the boundary portion between each of the narrow section 8au, tapered section 8at, wide straight section 8as, and arc-shaped section 8ab may be rounded in a cross-sectional view from the viewpoint of suppressing stress concentration at the boundary portions.

As illustrated in FIG. 2B, in a cross-sectional view perpendicular to the extending direction of the shoulder-side narrow groove portion 8b on the tread surface 11, the shoulder-side narrow groove portion 8b (81b to 84b) of the widthwise narrow groove 8 (81 to 84) is formed, from groove opening side to groove bottom side, in a shape of a continuous series of: a narrow section 8bu including the groove opening; a tapered section 8bt where the groove width W2 increases toward the groove bottom; and an arc-shaped section 8bb including the groove bottom. In other words, in the above cross-sectional view, the shoulder-side narrow groove portion 8b is formed in the shape of a flask.

The cross-sectional shape of the shoulder-side narrow groove portion 8b differs from that of the center-side narrow groove portion 8a only in that it does not have a section corresponding to the wide straight section 8as in the center-side narrow groove portion 8a described above, and is otherwise substantially the same as the center-side narrow groove portion 8a. That is, the narrow section 8bu of the shoulder-side narrow groove portion 8b and the above-mentioned narrow section 8au of the center-side narrow groove portion 8a, the tapered section 8bt of the shoulder-side narrow groove portion 8b and the above-mentioned tapered section 8at of the center-side narrow groove portion 8a, and the arc-shaped section 8bb of the shoulder-side narrow groove portion 8b and the above-mentioned arc-shaped section 8ab of the center-side narrow groove portion 8a, respectively, have substantially the same cross-sectional shape, so their description is omitted.

In this embodiment, as illustrated in FIG. 2B, the boundary portion of the narrow section 8bu and the tapered section 8bt of the shoulder-side narrow groove portion 8b is angular in a cross-sectional view. However, the boundary portion between each of the narrow section 8bu, tapered section 8bt, and arc-shaped section 8bb may be rounded in a cross-sectional view from the viewpoint of suppressing stress concentration at the boundary portions.

Note, that in this embodiment, as illustrated in FIGS. 1 and 3, the widthwise narrow grooves 81 and 83 further have second shoulder-side narrow groove portions 81c and 83c, respectively, which are connected to the outer side of the shoulder-side narrow groove portions 81b and 83b in the tire width direction. The cross-sectional shape of the second shoulder-side narrow groove portions 81c and 83c is not particularly restricted and may be, for example, a groove that extends from the groove opening to near the groove bottom with a substantially constant groove width. In addition, in the example illustrated in the figure, the second shoulder-side narrow groove portions 81c and 83c are formed as narrow grooves, however, they may not be formed as narrow grooves. Furthermore, the widthwise narrow groove 8 does not have to have the second shoulder-side narrow groove portions 81c and 83c, as do the widthwise narrow grooves 82 and 84.

Hereinafter, the causes of cut separation are explained with reference to FIG. 4, and the effects of the above-mentioned embodiments are explained.

Figure 4:
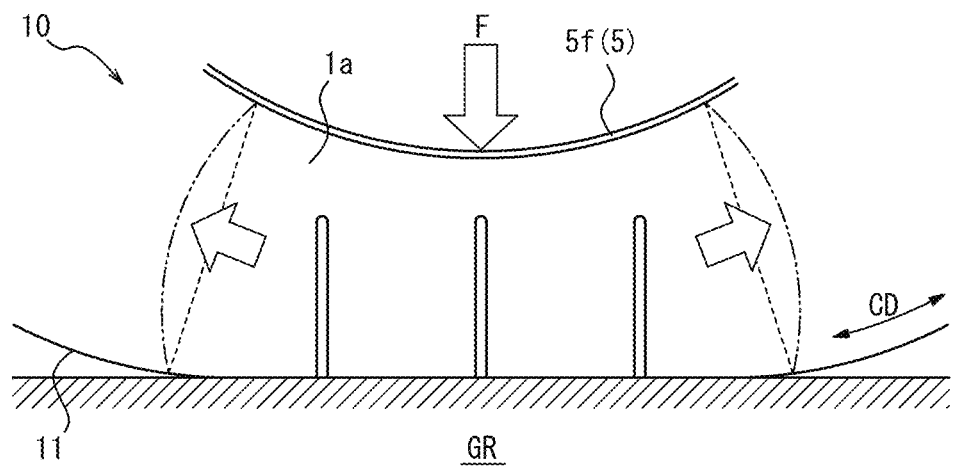
FIG. 4 is a schematic drawing that explains the causes of cut separation.

FIG. 4 is a schematic drawing (which may be viewed as a schematic cross-sectional view) to explain the causes of cut separation.

The cut separation is the separation that occurs between the tread rubber and the belt due to cuts from the road surface. More specifically, the cut separation is a phenomenon that occurs when the tread surface is subjected to a cut scratch by foreign objects on the road surface, and after the cut reaches the boundary between the tread rubber and the belt, shear strain between the tread rubber and the belt causes a wider separation between the tread rubber and the belt, extending further along the belt.

FIG. 4 is a schematic view of the tire 10 in rolling, with the tire 10 on the road surface GR, viewed from the side of the tire 10. The tire 10 is assumed to rotate in the circumferential direction of the tire, indicated by the sign CD in the figure. In this state, since the tire 10 is grounded to the road surface GR under load F, the tread rubber 1a of the grounded portion is crushed between the belt 5 (more specifically, the belt layer 5f closest to the tread surface 11) (see FIG. 3) and the road surface GR, and expands outward in the tire circumferential direction (generally referred to as crushing deformation), as illustrated by the two-dotted line in FIG. 4. This causes a large circumferential shear strain between the tread rubber 1a and the belt 5, and if there are cuts that reach the belt 5, they can spread along the belt 5 and cause the cut separations.

Here, for example, as illustrated in FIG. 4, even if grooves with a relatively small groove width are provided on the tread surface 11, the outward expansion (crushing deformation) of the above tread rubber 1a in the tire circumferential direction cannot be suppressed. However, when grooves with a large groove width are provided, the groove walls of the grooves expand toward the interior of the grooves to absorb and suppress the crushing deformation of the above tread rubber 1a, and this can reduce the circumferential shear strain between the tread rubber 1a and the belt 5, thereby reducing the cut separation.

On the other hand, increasing the groove width of the grooves provided in the tread portion 1 is effective in suppressing the cut separation as described above, however, it also reduces the rubber volume of the tread portion and decreases tread rigidity (block rigidity), resulting in a decrease in the wear life of the tire.

In addition, for example, tires for construction and mining vehicles (e.g., dump truck tires for mining use) are often mounted on the front axle when new and rotated to the rear axle in the middle of wear, and cut separation often occurs when the tires are used on the rear axle in the middle of such wear. This is because rear axle-mounted tires often receive cuts when they step on rocks or other foreign objects on the road surface that are not visible to the driver, especially when driving backwards.

Furthermore, cut scratches, which are the starting point of cut separation, often occur near the center of the tread surface 11 in the tire width direction. This is because, as mentioned above, belt layers (e.g., the belt layers 5a and 5b in FIG. 5) with a relatively narrow width in the tire width direction that exert a so-called tagger effect are often placed near the center of the tread surface 11 in the tire width direction, and the tagger effect of such belts induces deep cuts on the contrary.

In view of the above analysis, according to the tire 10 of the present embodiment, since the widthwise narrow groove 8 provided on the tread surface 11 has a center-side narrow groove portion 8a located on the inner side in the tire width direction, and the center-side narrow groove portion 8a has a wide straight section 8as extending in the groove depth direction with a constant groove width and having a groove width larger than that of the narrow section 8au, near the tire widthwise center of the tread surface 11, where cut separation is likely to occur, the crushing deformation of the tread rubber 1a can be fully absorbed by the wide straight section 8as, and thus cut separation can be effectively suppressed.

Also, according to the tire 10 of this embodiment, since the wide straight section 8as is located midway in the groove depth direction of the center-side narrow groove portion 8a, sandwiched between the narrow section 8au and the tapered section 8at, and the arc-shaped section 8ab, in the early stages of wear, the rubber volume of the tread 1 is secured, thereby suppressing the decline in wear life, while in the middle stages of wear, when cut separation is likely to occur, the wide straight section 8as appears, thereby effectively suppressing the cut separation.

In addition, according to the tire 10 of this embodiment, the shoulder-side narrow groove portion 8b, which is connected to the outer side of the center-side narrow groove portion 8a in the tire width direction, does not have the same wide straight section as the center-side narrow groove portion 8a, adequate wear life can be maintained without reducing rubber volume or tread rigidity (block rigidity) it may occur when the wide straight section were provided.

Furthermore, according to the tire 10 of this embodiment, both the center-side narrow groove portion 8a and the shoulder-side narrow groove portion 8b of the widthwise narrow groove 8 have arc-shaped portions 8ab or 8bb that include the groove bottom (i.e., located at the groove bottom), which can suppress groove bottom cracking.

From the above, according to the tire 10 of this embodiment, cut separation can be suppressed while maintaining a sufficient wear life.

The following is a description of the suitable configuration, etc., of the tire 10 in this embodiment.

In the tire 10 of this embodiment, in a developed view of the tread surface, when a tire widthwise position that is separated from a tire equatorial plane CL by ⅛-width ((⅛) TW), which is obtained by dividing the tread width into 8 equal parts, is referred to as a ⅛ point (indicated by the sign P1/8 in FIGS. 1 and 3), the center-side narrow groove portion 8a is located in a tire widthwise region between both of the ⅛ points (i.e., the tire widthwise region on the inner side from the ⅛ points, including the ⅛ points), (i.e., ⅛ point on each side across the tire equatorial plane CL). Since the region in the tire width direction between the two ⅛ points is often subjected to fatal cuts that become the starting point of cut separation, it is sufficient to arrange the center-side narrow groove portion 8a, which is effective in suppressing the cut separation, in the area. On the other hand, the shoulder-side narrow groove portion 8b, which does not have the wide straight section and is effective in maintaining wear life, is arranged on the outer side of this area in the tire width direction, thereby maintaining wear life more effectively.

Here, as mentioned above, in this embodiment, the boundary position in the tire width direction between the center-side narrow groove portion 8a (81a to 84a) and the shoulder-side narrow groove portion 8b (81b to 84b) on the tread surface 11 is on ⅛ point, respectively. In other words, the center-side narrow groove portion 8a extends over the entire tire widthwise region inside the ⅛ points including the ⅛ points, in each of the width direction narrow grooves 8.

However, the center-side narrow groove portion 8a need not be arranged over the entire tire widthwise region inside the ⅛ points including the ⅛ points in the width direction narrow groove 8. The center-side narrow groove portion 8a may be located in a portion of the tire widthwise region inside the ⅛ points including the ⅛ points in the width direction narrow groove 8. From the viewpoint of sufficiently suppressing the cut separation, for example, when the tire widthwise position separated from the tire equatorial plane CL by 3/32 of the tread width TW ((3/32) TW) is referred to as a ³⁄₃₂ point, the center-side narrow groove portion 8*a* is preferably arranged from the inner edge in the tire width direction of the widthwise narrow groove 8 to a tire widthwise position between the ³⁄₃₂ point and the ⅛ point, outwardly in the tire width direction.

However, the range of arrangement of the center-side narrow groove portion 8*a* in the tire width direction may not be as described above.

In the tire 10 of this embodiment, in a cross-sectional view in the tire width direction, when a maximum groove depth in the tread portion 1 is referred to as OTD, and a position where the groove bottom of a maximum groove depth portion BOTD, which has the maximum groove depth, is connected in a direction parallel to the tread surface 11 is referred to as an OTD position (indicated by the sign POTD in FIGS. 2 and 3), the distance D1 in the groove depth direction between a boundary position of the narrow section 8*au* and the tapered section 8*at* in the center-side narrow groove portion 8*a*, and the OTD position POTD (See FIG. 2A) is preferably ⅔ or less of the OTD.

In the tire rotation described above, tires are generally used on the front axle, where the cut separation occurs less frequently, until the tires are worn to the position in the groove depth direction where the distance in the groove depth direction from the OTD position POTD is approximately ⅔ of the OTD. Therefore, by setting the distance D1 in the groove depth direction between the boundary position of the narrow section 8*au* and the tapered section 8*at* in the center-side narrow groove portion 8*a* and the OTD position POTD to ⅔ or less of the OTD, as described above, the length of the narrow section 8*au* in the groove depth direction can be increased without significantly compromising cut separation resistance. This allows a large rubber volume to be secured, and the wear life to be maintained more effectively.

Note, that as illustrated in FIG. 3, the maximum groove depth portion (and thus the groove bottom BOTD of the maximum groove depth portion) is within the second shoulder-side narrow groove portion 81*c* (or 83*c*) of the widthwise narrow groove 81 (or 83), however, the maximum groove depth portion may be located elsewhere in the tread portion 1.

In addition, the OTD position POTD is, in other words, the position in the direction perpendicular to the tread surface 11 on an imaginary plane (including a curved surface) parallel to the tread surface 11 that passes through the groove bottom BOTD of the maximum groove depth portion. However, for simplicity of explanation, they are illustrated in straight lines in FIGS. 2A and 2B, along with the tread surface 11. The OTD is, in other words, the distance between the POTD and the tread surface 11 which are parallel to each other.

Note, that from the same perspective as above, the distance D1 in the groove depth direction between a boundary position of the narrow section 8*bu* and the tapered section 8*bt* in the shoulder-side narrow groove portion 8*b* (See FIG. 2B), and the OTD position POTD is preferably ⅔ or less of the OTD, as well as the distance D1 in the groove depth direction between a boundary position of the narrow section 8*au* and the tapered section 8*at* in the center-side narrow groove portion 8*a* (See FIG. 2A), and the OTD position POTD.

In the tire 10 of this embodiment, the distance D2 in the groove depth direction between a boundary position of the tapered section 8*at* and the wide straight section 8*as* in the center-side narrow groove portion 8*a*, and the OTD position POTD is preferably ⅙ or more of the OTD.

In general, when the tires wore to near the position in the groove depth direction where the distance in the groove depth direction from the OTD position POTD is about ⅓ of the OTD (at that point, the groove wall expands most significantly toward the interior of the groove during load loading near the position in the groove depth direction that is half of the groove depth at that point, which is approximately ⅙ of the OTD from the OTD position POTD), the incidence of cut separation is particularly high, and thereafter, the incidence of cut separation decreases. Therefore, as described above, the cut separation is more effectively suppressed by setting the distance D2 in the groove depth direction between the boundary position of the tapered section 8*at* and the wide straight section 8*as* in the center-side narrow groove portion 8*a*, and the OTD position POTD to ⅙ or more of the OTD.

In order to fully absorb the above-mentioned crushing deformation of the tread rubber 1*a* and to effectively suppress the cut separation, when the narrow section 8*au* and the tapered section 8*at* are completely worn away and the wide straight section 8*as* appears on the tread surface 11, the wide straight section 8*as* should have its groove width W3 and length D4 in the groove depth direction (see FIG. 2A) set so that the groove walls of the wide straight section 8*as* do not contact each other (i.e., the wide straight section 8*as* does not close), with the tire mounted on the applicable rim, filled with the prescribed internal pressure and loaded with a maximum load.

In addition, for the wide straight section 8*as*, its length D4 in the groove depth direction is preferably 0.15 to 0.5 times the OTD from the viewpoint of both suppressing cut separation and maintaining wear life, and from the same perspective, its groove width W3 is preferably 1.5 to 3.0 times the groove width W1 of the narrow section 8*au* (more specifically, the maximum groove width of the narrow section 8*au*).

In the tire 10 of this embodiment, the distance D3 in the groove depth direction between the groove bottom of the center-narrow groove portion 8*a* and the OTD position POTD is preferably ¹⁄₁₂ or less of the OTD.

This allows for a longer length in the groove depth direction of the wide straight section 8*as* which can contribute to the suppression of cut separation, thus the cut separation is more effectively suppressed.

In the tire 10 of this embodiment, it is preferable that the groove depth of the shoulder-side narrow groove portion 8*b* is shallower than the groove depth of the center-side narrow groove portion 8*a*. In other words, the distance D3 in the groove depth direction between the groove bottom of the shoulder-side narrow groove portion 8*b* and the OTD position POTD (see FIG. 2B) is preferably greater than the distance D3 in the groove depth direction between the groove bottom of the center-side narrow groove portion 8*a* and the OTD position POTD (see FIG. 2A).

As a result, compared to the case where the groove depth of the shoulder-side narrow groove portion 8*b* and the groove depth of the center-side narrow groove portion 8*a* are the same, the groove depth of the shoulder-side narrow groove portion 8*b* becomes shallower, and thus the wear life is improved by increasing the rubber volume, or the groove depth of the center-side narrow groove portion 8*a* becomes deeper, and thus cut separation is more efficiently suppressed. In other words, the above configuration enables both maintenance of wear life and suppression of cut separation more effectively.

In the tire 10 of this embodiment, as in the present embodiment, the tire 10 is preferably a tire for construction and mining vehicles. The tires for construction and mining vehicles have a high frequency of cut separation, and compatibility between wear life and such cut separation is particularly problematic, so each of the above-mentioned effects of this embodiment can be more effectively demonstrated.

The above describes an exemplary embodiment of this disclosure, and various changes can be made without departing from the scope of the claims.

EXAMPLES

Examples of the present disclosure are described below, however, this disclosure is not limited to the following examples.

The transition of shear strain in the tire circumferential direction (circumferential shear strain) during tire rolling was determined by FEM calculations for Comparative Example tire and Example tire, which have substantially the same configuration as the tires illustrated in FIGS. 1 to 3, except for the configuration of the widthwise narrow grooves 8. The FEM conditions were as follows:

Tire size: 50/80R57
Rim size: 32.00/6.0
Internal pressure: 700 KPa
Load: 73 tons
Wear condition: After 50 mm wear out of OTD of 95 mm
Shape of widthwise narrow grooves and groove depth after the wear described above (+50 mm is the groove depth when new, respectively):

(Comparative Example tires) All had the cross-sectional shape illustrated in FIG. 2B and all have groove depth of 23 mm (Example tire) Each had the shape illustrated in FIGS. 1 and 2 described above as an embodiment, and had a groove depth of 40 mm from the tire equatorial plane CL to ⅛ point, P1/8, and a groove depth of 23 mm on the outer side in the tire width direction from ⅛ point, P1/8.

Under the above FEM conditions, the transition of the strain in the tire circumferential direction (circumferential shear strain) on the belt layer 5*f* closest to the tread surface 11 (more specifically, between the belt layer 5*f* and the tread rubber 1*a* near the tire equatorial plane CL) in the tire configuration of FIG. 3, as described above with reference to FIG. 4, was determined.

Figure 5A:
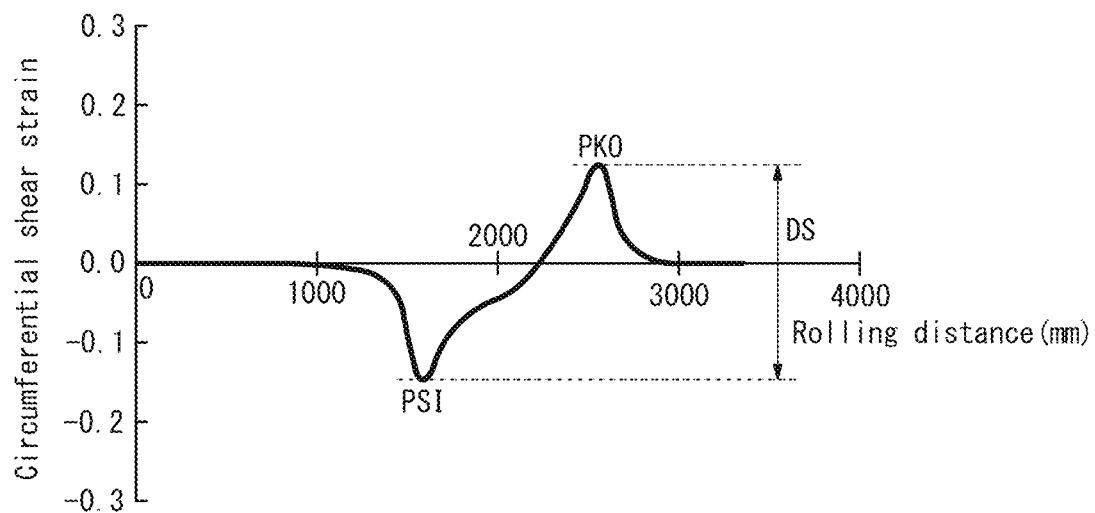
FIG. 5A is a graph indicating the relationship between rolling distance and circumferential shear strain in a tire of Comparative Example.
Figure 5B:
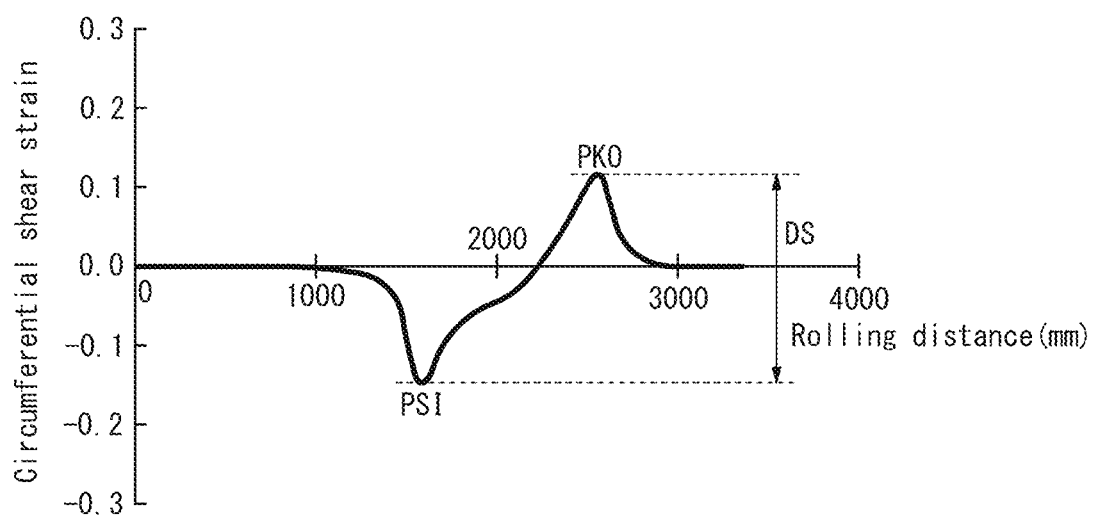
FIG. 5B is a graph indicating the relationship between rolling distance and circumferential shear strain in a tire of Example.

The results are provided in FIGS. 5A and 5B.

In FIGS. 5A and 5B, the sign PSI represents the step-in position, the sign PKO represents the kick-out position, and the sign DS represents the strain difference. That is, the graphs in FIGS. 5A and 5B indicates how the circumferential shear strain changes as the tire rolls, including from the step-in side to the kick-out side. In each figure, the circumferential shear strain (vertical axis) is provided as an index.

Here, the smaller the strain difference DS between the step-in position PSI and the kick-out position PKO, the less likely it is that separation will develop.

According to the results in FIGS. 5A and 5B, when the strain difference DS in Comparative Example tire indicated in FIG. 5A was 100, the strain difference DS in Example tire indicated in FIG. 5B was 95, indicating that the strain difference DS was reduced by 5%. This means that the Example tire can sufficiently suppress the cut separation.

INDUSTRIAL APPLICABILITY

The tire according to the present disclosure can be suitably used for any type of tire, and it is particularly suitable for use in pneumatic tires for construction and mining vehicles, especially in tires for construction and mining vehicles for good roads.

REFERENCE SIGNS LIST

1 Tread portion
1*a* Tread rubber
2 Sidewall portion
3 Bead portion
3*a* Bead core
4 Carcass
5 Belt
5*a*-5*f* Belt layer
7, 71-73 Circumferential narrow groove
8, 81-84 Widthwise narrow groove
8*a*, 81*a*-84*a* Center-side narrow groove portion
8*b*, 81*b*-84*b* Shoulder-side narrow groove portion
81*c*, 83*c* Second shoulder-side narrow groove portion
8*au*, 8*bu* Narrow section
8*at*, 8*bt* Tapered section
8*as* Wide straight section
8*ab*, 8*bb* Arc-shaped section
9, 91-92 Lug groove
10 Tire
11 Tread surface
BOTD Groove bottom of maximum groove depth portion
CD Tire circumferential direction
CL Tire equatorial plane
D1-D3 Distance in groove depth direction
D4 Length in groove depth direction
DS Strain difference
F Load
GR Ground surface
OTD Maximum groove depth in a tread portion
POTD OTD position
PKO Kick-off position
PSI Step-in position
P1/8 ⅛ point
RD Tire radial direction
TE Tread edge
TW Tread width
W1-W3 Groove width
WD Tire width direction

The invention claimed is:

1. A tire comprising a widthwise narrow groove extending with a tire widthwise component on a tread surface, wherein
the widthwise narrow groove has a center-side narrow groove portion located on the inner side in the tire width direction and a shoulder-side narrow groove portion connected to the outer side of the center-side narrow groove portion in the tire width direction,
in a cross-sectional view perpendicular to the extending direction of the center-side narrow groove portion, the center-side narrow groove portion is formed, from groove opening side to groove bottom side, in a shape of a continuous series of: a narrow section including the groove opening; a tapered section where the groove width increases toward the groove bottom; a wide straight section extending in the groove depth direction with a constant groove width and having a groove width greater than that of the narrow section; and an arc-shaped section including the groove bottom, and
in a cross-sectional view perpendicular to the extending direction of the shoulder-side narrow groove portion, the shoulder-side narrow groove portion is formed, from groove opening side to groove bottom side, in a shape of a continuous series of: a narrow section including the groove opening; a tapered section where the groove width increases toward the groove bottom; and an arc-shaped section including the groove bottom.

2. The tire according to claim 1, wherein in a developed view of the tread surface, when a tire widthwise position that is separated from a tire equatorial plane by ⅛-width, which is obtained by dividing a tread width into 8 equal parts, is referred to as a ⅛ point, the center-side narrow groove portion is arranged in a tire widthwise region between both of the ⅛ points.

3. The tire according to claim 1, wherein in a cross-sectional view in the tire width direction, when a maximum groove depth in a tread portion is referred to as OTD, and a position where the groove bottom of a maximum groove depth portion, which has the maximum groove depth, is connected in a direction parallel to the tread surface is referred to as an OTD position, distance in the groove depth direction between a boundary position of the narrow section and the tapered section in the center-side narrow groove portion, and the OTD position is ⅔ or less of the OTD.

4. The tire according to claim 1, wherein in a cross-sectional view in the tire width direction, when a maximum groove depth in a tread portion is referred to as OTD, and a position where the groove bottom of a maximum groove depth portion, which has the maximum groove depth, is connected in a direction parallel to the tread surface is referred to as an OTD position, distance in the groove depth direction between a boundary position of the tapered section and the wide straight section in the center-side narrow groove portion, and the OTD position is ⅙ or more of the OTD.

5. The tire according to claim 1, wherein in a cross-sectional view in the tire width direction, when a maximum groove depth in a tread portion is referred to as OTD, and a position where the groove bottom of a maximum groove depth portion, which has the maximum groove depth, is connected in a direction parallel to the tread surface is referred to as an OTD position, distance in the groove depth direction between the groove bottom of the center-narrow groove portion and the OTD position is 1/12 or less of the OTD.

6. The tire according to claim 1, wherein the groove depth of the shoulder-side narrow groove portion is shallower than the groove depth of the center-side narrow groove portion.

7. The tire according to claim 1, wherein the tire is a tire for construction and mining vehicles.

8. The tire according to claim 2, wherein in a cross-sectional view in the tire width direction, when a maximum groove depth in a tread portion is referred to as OTD, and a position where the groove bottom of a maximum groove depth portion, which has the maximum groove depth, is connected in a direction parallel to the tread surface is referred to as an OTD position, distance in the groove depth direction between a boundary position of the narrow section and the tapered section in the center-side narrow groove portion, and the OTD position is ⅔ or less of the OTD.

9. The tire according to claim 2, wherein in a cross-sectional view in the tire width direction, when a maximum groove depth in a tread portion is referred to as OTD, and a position where the groove bottom of a maximum groove depth portion, which has the maximum groove depth, is connected in a direction parallel to the tread surface is referred to as an OTD position, distance in the groove depth direction between a boundary position of the tapered section and the wide straight section in the center-side narrow groove portion, and the OTD position is ⅙ or more of the OTD.

10. The tire according to claim 3, wherein in a cross-sectional view in the tire width direction, when a maximum groove depth in a tread portion is referred to as OTD, and a position where the groove bottom of a maximum groove depth portion, which has the maximum groove depth, is connected in a direction parallel to the tread surface is referred to as an OTD position, distance in the groove depth direction between a boundary position of the tapered section and the wide straight section in the center-side narrow groove portion, and the OTD position is ⅙ or more of the OTD.

11. The tire according to claim 2, wherein in a cross-sectional view in the tire width direction, when a maximum groove depth in a tread portion is referred to as OTD, and a position where the groove bottom of a maximum groove depth portion, which has the maximum groove depth, is connected in a direction parallel to the tread surface is referred to as an OTD position, distance in the groove depth direction between the groove bottom of the center-narrow groove portion and the OTD position is 1/12 or less of the OTD.

12. The tire according to claim 3, wherein in a cross-sectional view in the tire width direction, when a maximum groove depth in a tread portion is referred to as OTD, and a position where the groove bottom of a maximum groove depth portion, which has the maximum groove depth, is connected in a direction parallel to the tread surface is referred to as an OTD position, distance in the groove depth direction between the groove bottom of the center-narrow groove portion and the OTD position is 1/12 or less of the OTD.

13. The tire according to claim 4, wherein in a cross-sectional view in the tire width direction, when a maximum groove depth in a tread portion is referred to as OTD, and a position where the groove bottom of a maximum groove depth portion, which has the maximum groove depth, is connected in a direction parallel to the tread surface is referred to as an OTD position, distance in the groove depth direction between the groove bottom of the center-narrow groove portion and the OTD position is 1/12 or less of the OTD.

14. The tire according to claim 2, wherein the groove depth of the shoulder-side narrow groove portion is shallower than the groove depth of the center-side narrow groove portion.

15. The tire according to claim 3, wherein the groove depth of the shoulder-side narrow groove portion is shallower than the groove depth of the center-side narrow groove portion.

16. The tire according to claim 4, wherein the groove depth of the shoulder-side narrow groove portion is shallower than the groove depth of the center-side narrow groove portion.

17. The tire according to claim 5, wherein the groove depth of the shoulder-side narrow groove portion is shallower than the groove depth of the center-side narrow groove portion.

18. The tire according to claim 2, wherein the tire is a tire for construction and mining vehicles.

19. The tire according to claim 3, wherein the tire is a tire for construction and mining vehicles.

20. The tire according to claim 4, wherein the tire is a tire for construction and mining vehicles.

\* \* \* \* \*